United States Patent Office 3,284,387
Patented Nov. 8, 1966

3,284,387
STABILIZED POLYMERIC COMPOSITION AND
METHOD OF PREPARING SAME
Giuseppe Cantatore and Fosco Bordini, Terni, Italy, assignors to Montecatini Società Generale per l'Industria Mineraria e Chimica, Milan, Italy
No Drawing. Filed Feb. 5, 1963, Ser. No. 256,249
Claims priority, application Italy, Feb. 8, 1962, 2,349/62
10 Claims. (Cl. 260—23)

The present invention relates to stabilized polymeric compositions, e.g., poly-alpha-olefins, and to a method of stabilizing fibers, films and other manufactured articles made from alpha-olefin polymers, particularly polypropylene.

It is known that polyolefin materials undergo degradation during hot working, particularly in the presence of atmospheric oxygen.

It is also known that the manufactured articles made from polyolefins consisting prevailingly of isotactic macromolecules are sensitive to the action of light and to thermal treatments.

This degradative action can be reduced by the addition of a small amount of any of a number of protective substances to the polymer, particularly during the preparation of fibers, films and the like therefrom.

Suitable protective substances used heretofore include amines, aminophenols, chelates of transition metals (e.g., Ni), organotin compounds, triazole compounds, zinc compounds, dithiocarbamates, phenols, phosphites, mercaptans, oximes, polyquinolines, sulfur derivatives, silicones, thiophosphites and the like.

We have now surprisingly found that mixtures of:

(a) A basic nitrogen polycondensate obtained by polycondensation of epichlorohydrin with amines or imines, or a basic nitrogen polycondensate obtained by polycondensation of dihalogen derivatives with one or more amines, and (b) A hydroxy benzotriazole compound, which may be substituted with halogens, alkyl groups and the like, exert a high stabilizing action when mixed with the polyolefin, in an amount not greater than about 5% by weight of the olefin polymer.

The above mixture of (a) and (b) is also suitable for the stabilization of compositions comprising a crystalline polyolefin which has been colored by the addition thereto of organic or inorganic dyeing pigments. Such pigments may be added to the polymer/stabilizer mixture before extrusion.

From the foregoing it will be seen that the present invention relates to polymeric compositions which are stable to the action of heat, ageing and light, which compositions comprise:

(a) A crystalline polyolefin, more particularly polypropylene, consisting prevailingly of isotactic macromolecules, (i.e., as defined by Natta et al. U.S. Patent 2,882,263) and (b) From about 0.2 to 5% by weight (of the polyolefin) of a mixture of a basic nitrogen polycondensate obtained by polycondensation of epichlorohydrin with amines or imines or by polycondensation of dihalogen derivatives with diamines, and a hydroxy benzotriazole compound.

The above composition can be used in combination with other stabilizers if desired, e.g., ultra violet absorbers. Moreover, pigments, dyes, fillers, and the like may be added thereto.

We have found that the addition of anti-acid substances such as the inorganic salts of stearic acid, e.g., calcium stearate, improves the stability characteristics of the polymeric compositions.

Particularly suitable basic nitrogen polycondensates are:

(a) Polycondensates of epichlorohydrin with one or more primary $C_3$–$C_{30}$ or secondary $C_4$–$C_{60}$ aliphatic amines, and with an aliphatic, aromatic or heterocyclic bis-secondary amine, prepared, e.g., according to the process described in U.S. patent application Serial No. 124,346, filed on July 17, 1961;

(b) Polycondensates of epichlorohydrin with one or more primary $C_3$–$C_{30}$ or secondary $C_4$–$C_{60}$ aliphatic amines and with a diamine, e.g., prepared according to the process described in U.S. patent application Serial No. 30,732, filed on May 23, 1960, now abandoned;

(c) Polycondensates of epichlorohydrin with amines, alkylated with long chain alkyl halides, prepared, e.g., according to the process described in U.S. patent application Serial No. 30,732, filed on May 23, 1960, now abandoned;

(d) Polycondensates of epichlorohydrin with one or more primary $C_3$–$C_{30}$ or secondary $C_4$–$C_{60}$ aliphatic amines and with one or more imines, prepared, e.g., according to the process described in U.S. patent application Serial No. 30,732, filed on May 23, 1960, now abandoned;

(e) Polycondensates of dihalogen derivatives with diamines which may or may not be alkylated, prepared e.g., according to the process described in U.S. patent application Serial No. 83,141, filed on January 17, 1961, now U.S. Patent No. 3,098,697;

(f) Polyethyleneimines.

Among the hydroxy benzotriazole compounds which are particularly suitable are those having the following structure:

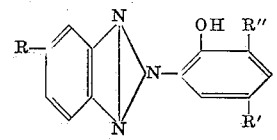

(I)

wherein R is halogen, hydrogen, alkyl, aryl, hydroxy or the like, and wherein R' and R" are alkyl, aryl or hydrogen; e.g., 2'-hydroxy-3'-tertiary butyl-5'-methyl-phenyl-5-chlorobenzotriazole and 2'-hydroxy-5'-tertiary butyl-phenyl-5-chlorobenzotriazole, which compounds have the following respective formulas:

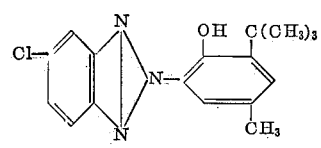

(II)

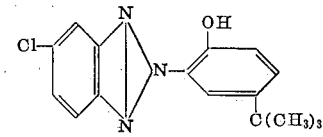

(III)

The stabilizing mixture may contain from about 1 to 99% by weight of the basic nitrogen polycondensate.

The hydroxybenzotriazoles which are used in accordance with the present invention can be obtained by any of the known methods for preparing such compounds, e.g., by the oxidation of amino-azo compounds of the type Ar(X)(NH₂)—N=N—Ar'X' in which X and X' are hydroxyls, carboxyls, halogens, alkyl groups or hydrogen (see U.S. Patent 2,362,988 and British Patents 555,971 and 556,143 in the name of Geigy); or by the reduction of nitro-azo-compounds of the type

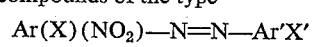

Ar(X)(NO₂)—N=N—Ar'X' in which X and X' have the aforementioned meaning (see Ann. 511, 241–257, 1934).

Spinning of the compositions of the present invention is preferably carried out by extrusion through spinnerets with holes having a length/diameter ratio higher than 1.

After spinning, the yarns are desirably subjected to a stretching treatment with stretching ratios of from about 1:2 to 1:10 at a temperature of from about 80 to 150° C. in stretching devices heated with hot air, steam, or a similar fluid, or provided with a heating plate.

The stabilizing mixture of the invention is generally intimately admixed with the polyolefin while agitating.

The stabilizing mixture may, however, be added by other methods, e.g., by mixing the polyolefin with a solution of the stabilizers in a suitable solvent and then evaporating the solvent, or by adding the stabilizers to the polyolefin at the end of the polymerization, etc. It is also possible to apply the stabilizing mixture onto the final manufactured article, e.g., by immersing the latter in a stabilizer solution or dispersion and then evaporating the solvent.

TABLE 1

|  | Ex. 1 | Ex. 2 | Ex. 3 | Ex. 4 | Ex. 5 |
|---|---|---|---|---|---|
| Composition of the mix: |  |  |  |  |  |
| Polypropylene— |  |  |  |  |  |
| Intrinsic viscosity [η]* | 1.48 | 1.48 | 1.6 | 1.6 | 1.6 |
| Ash content, percent | 0.12 | 0.12 | 0.029 | 0.029 | 0.029 |
| Residue after extraction with n-heptane, percent | 93.9 | 93.9 | 94.4 | 94.4 | 94.4 |
| Dichloroethane/hexamethylenediamine polycondensate (molar ratio 1:1.15), percent | 0.5 |  |  |  |  |
| Octadecylamine/epichlorohydrin/piperazine polycondensate (molar ratio 0.4:1.4:1), percent |  |  | 0.5 |  |  |
| Octadecylamine/epichlorohydrin/hexamethylenediamine polycondensate (weight ratio 3.45:9.25:9.5), percent |  |  |  | 0.5 |  |
| 2'-hydroxy-3'-tertiary butyl-5'-methyl-phenyl-5-chloro-benzotriazole, percent | 0.5 |  | 0.5 | 0.5 |  |
| 2'-hydroxy-5'-tertiary butyl-phenyl-5-chlorobenzotriazole, percent |  |  |  |  | 0.5 |
| TiO$_2$, percent | 0.25 | 0.25 | 0.25 | 0.25 | 0.25 |
| Technology of the mixer | Henschel | Henschel | Henschel | Henschel | Henschel |
| Color of the mixture molten in a test tube at 250° C. for 10 minutes | Clear | Clear | Clear | Clear | Clear |
| Spinning conditions: |  |  |  |  |  |
| Screw temperature, ° C. | 230 | 230 | 240 | 240 | 240 |
| Head temperature, ° C. | 230 | 230 | 240 | 240 | 240 |
| Spinneret temperature, ° C. | 240 | 240 | 240 | 240 | 240 |
| Spinneret type | 60/0.5.10 | 60/0.5.10 | 40/0.8.16 | 40/0.8.16 | 40/0.8.16 |
| Max. pressure (kg./cm.²) | 45 | 48 | 51 | 55 | 50 |
| Winding speed, meters/min | 390 | 390 | 390 | 390 | 390 |
| Stretching conditions: |  |  |  |  |  |
| Temperature, ° C. | 120 | 120 | 120 | 120 | 120 |
| Medium | Steam | Steam | Steam | Steam | Steam |
| Stretching ratio | 1:5 | 1:5 | 1:5 | 1:5 | 1:5 |
| Characteristics of the stretched yarn: |  |  |  |  |  |
| Tenacity (g./den.) | 5.8 | 5.5 | 5.75 | 6.0 | 5.7 |
| Elongation (percent) | 22.5 | 22 | 24 | 29.0 | 22 |
| Thermal degradation (percent decrease of the intrinsic viscosity upon extrusion) | 90 | 73 | 81 | 80 | 78 |
| Stability to accelerated thermal ageing (percent residual tenacity after exposure at 120° C. in an air-circulated oven for 15 hours) | 83 | Brittle |  |  |  |
| Stability to sun light (percent residual tenacity after exposure to summer sun light for 200 hours) | 78 | 34 | 79 | 78 | 76 |

*As determined in tetrahydronaphthalene at 135° C.

TABLE 2

|  | Ex. 6 | Ex. 7 | Ex. 8 | Ex. 9 | Ex. 10 | Ex. 11 |
|---|---|---|---|---|---|---|
| Composition of the mixture: |  |  |  |  |  |  |
| Polypropylene— |  |  |  |  |  |  |
| Intrinsic viscosity [η] | 1.6 | 1.6 | 1.6 | 1.6 | 1.6 | 1.6 |
| Ash content, percent | 0.029 | 0.029 | 0.029 | 0.029 | 0.029 | 0.029 |
| Residue after extraction with n-heptane, percent | 94.4 | 94.4 | 94.4 | 94.4 | 94.4 | 94.4 |
| Dichloroethane/hexamethylenediamine polycondensate (molar ratio 1:1.5), percent |  | 0.5 |  |  |  |  |
| Octadecylamine/epichlorohydrin piperazine polycondensate (molar ratio 0.4:1.4:1), percent |  |  | 0.5 |  |  |  |
| Octadecylamine/epichlorohydrin/hexamethylenediamine polycondensate (weight ratio 3.45:9.25:9.5), percent |  |  |  | 0.5 |  |  |
| 2'-hydroxy-3'-tertiary butyl-5'-methyl-phenyl-5-chloro-benzotriazole, percent |  |  |  |  | 0.5 |  |
| 2'-hydroxy-5'-tertiary butyl-phenyl-5-chlorobenzotriazole, percent |  |  |  |  |  | 0.5 |
| TiO$_2$, percent | 0.25 |  |  |  |  |  |
| Technology of the mixer | Henschel | Henschel | Henschel | Henschel | Henschel | Henschel |
| Color of the mix molten in a test tube at 250° C. for 10 minutes | Clear | Clear | Clear | Clear | Clear | Clear |
| Spinning conditions: |  |  |  |  |  |  |
| Screw temperature, ° C. | 240 | 250 | 250 | 250 | 250 | 250 |
| Head temperature, ° C. | 240 | 250 | 250 | 250 | 250 | 250 |
| Spinneret temperature, ° C. | 240 | 250 | 250 | 250 | 250 | 250 |
| Spinneret type | 40/0.8.16 | 40/0.8.16 | 40/0.8.16 | 40/0.8.16 | 40/0.8.16 | 40/0.8.16 |
| Max. pressure (kg./cm.²) | 50 | 55 | 41 | 50 | 65 | 48 |
| Winding speed, meters/min | 390 | 390 | 390 | 390 | 390 | 390 |
| Stretching conditions: |  |  |  |  |  |  |
| Temperature, ° C. | 120 | 120 | 120 | 120 | 120 | 120 |
| Medium | Steam | Steam | Steam | Steam | Steam | Steam |
| Stretching ratio | 1:5 | 1:5 | 1:5 | 1:5 | 1:5 | 1:5 |
| Characteristics of the stretched yarn: |  |  |  |  |  |  |
| Tenacity (g./den.) | 5.41 | 5.3 | 5.5 | 5.6 | 5.5 | 5.45 |
| Elongation (percent) | 26 | 22.8 | 25 | 24 | 22.5 | 25 |
| Thermal degradation (percent decrease of the intrinsic viscosity upon extrusion) | 71 | 90 | 78 | 82 | 80 | 74 |
| Stability to accelerated thermal ageing (percent residual tenacity after exposure at 120° C. in an air-circulated oven for 15 hours) |  | 73 |  |  | Brittle | Brittle |
| Stability to sun light (percent residual tenacity after exposure to summer light for 200 hours) | 29 | 48 | 60 | 72 | 67 | 65 |

The compounds of the present invention exhibit a good compatibility with polyolefins in the molten state and have no staining action.

The stabilized compositions of the present invention are particularly suitable for preparing mono- and pluro-filaments, staple, bulk yarns, films, tapes, shaped articles and the like.

The mono- or pluro plurofilaments obtained according to the invention can be subjected, if desired, to treatments which render completely water-insoluble the basic nitrogen compound. For this purpose one can treat the filaments with formaldehyde, diisocyanates, or with monomers capable of giving tridimensional structures such as divinylbenzene, vinylacetylene and the like, or with diepoxy compounds. This treatment can be carried out before or after stretching.

The preceding examples, which are fully reported in Tables 1 and 2, will further illustrate the invention. It will be noted that the runs were carried out using two different polypropylenes.

Variations can, of course, be made without departing from the spirit of our invention.

Having thus described our invention what we desire to secure and claim by Letters Patent is:

1. A polymeric composition which is stable against the action of heat, ageing and light, said composition comprising:
    (a) a polypropylene consisting prevailingly of isotactic macromolecules and
    (b) a stabilizing mixture comprising
        (1) a hydroxybenzotriazole and
        (2) a basic condensation product of epichlorohydrin with an amine or imine or of a dihalogen alkane with a diamine, said basic condensation product being present in an amount of from about 1 to 99% by weight of said stabilizing mixture.

2. The polymeric composition of claim 1, wherein said stabilizing mixture is present in an amount of from about 0.02 to 5% by weight of said isotactic polypropylene.

3. The polymeric composition of claim 1, wherein said stabilizing mixture is present in an amount of from about 0.2 to 1% by weight of said isotactic polypropylene.

4. The polymeric composition of claim 1, wherein said stabilizing mixture consists of dichloroethane hexamethylenediamine polycondensate and 2-hydroxy-3'-tertiary butyl-5'-methyl-phenyl-5-chlorobenzotriazole.

5. The polymeric composition of claim 1, wherein said stabilizing mixture consists of octadecylamine/epichlorohydrin/piperazine polycondensate and 2-hydroxy-5'-tertiary butyl-phenyl-5-chlorobenzotriazole.

6. The polymeric composition of claim 1 wherein said stabilizing mixture consists of octadecylamine/epichlorohydrin/piperazine polycondensate and 2'-hydroxy-3'-tertiary butyl-5'-methyl-phenyl-5-chlorobenzotriazole.

7. The polymeric composition of claim 1 wherein said stabilizing mixture consists of octadecylamine/epichlorohydrin/hexamethylene diamine polycondensate and 2'-hydroxy-3' - tertiary butyl-5'-methyl-phenyl-5-chlorobenzotriazole.

8. The polymeric composition of claim 1, which composition also contains an inorganic salt of stearic acid.

9. The composition of claim 1 in film form.

10. The composition of claim 1 in fiber form.

References Cited by the Examiner

UNITED STATES PATENTS 3,004,896   10/1961   Heller et al. _____ 260—45.8
3,031,505   4/1962    Pollitzer _____ 260—2

MURRAY TILLMAN, *Primary Examiner.*

D. J. BREZNER, *Assistant Examiner.*